United States Patent [19]
Honma

[11] 3,842,501
[45] Oct. 22, 1974

[54] KNIFE

[76] Inventor: Akira Honma, 552, Oaza-Takayama, Tokamachi, Japan

[22] Filed: May 9, 1973

[21] Appl. No.: 358,811

[30] Foreign Application Priority Data
May 15, 1972 Japan.............................. 47-056685

[52] U.S. Cl..................................... 30/286, 30/355
[51] Int. Cl......................... B26b 9/02, B26b 29/02
[58] Field of Search............ 30/286, 346.55, 346.56, 30/355, 357

[56] References Cited
UNITED STATES PATENTS

| | | | |
|---|---|---|---|
| 453,296 | 6/1891 | Tata...................................... | 30/355 |
| 527,175 | 10/1894 | Hurd...................................... | 30/286 |
| 1,077,545 | 11/1913 | Oberheim ......................... | 30/286 X |
| 1,135,987 | 4/1915 | Beecher............................. | 30/286 X |
| 1,579,577 | 4/1926 | Thompson........................ | 30/355 X |

Primary Examiner—Al Lawrence Smith
Assistant Examiner—J. C. Peters
Attorney, Agent, or Firm—Eric H. Waters, et al.

[57] ABSTRACT

Direct contact of the cutting edge of a knife with a cutting board is prevented in a knife comprising a blade having a cutting edge, a series of portions projecting beyond the cutting edge, a series of portions concave relative to the same edge, the projecting portions and the concave portions being disposed alternately along the cutting edge, each of the concave portions forming an individual cutting edge, and a substantially flat surface of a minimized area formed at the end of each of the projecting portions, which surface abuts against the cutting board when the knife is used with the cutting board.

2 Claims, 7 Drawing Figures

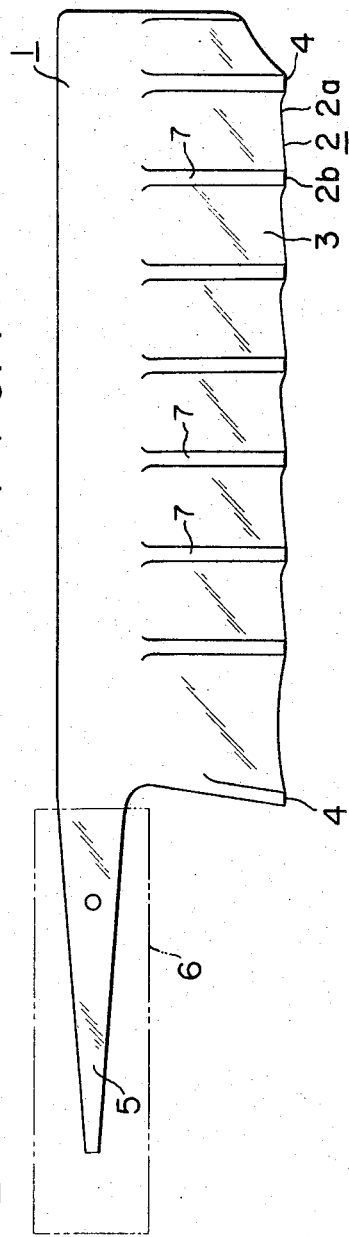
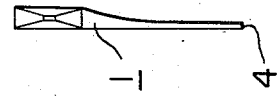
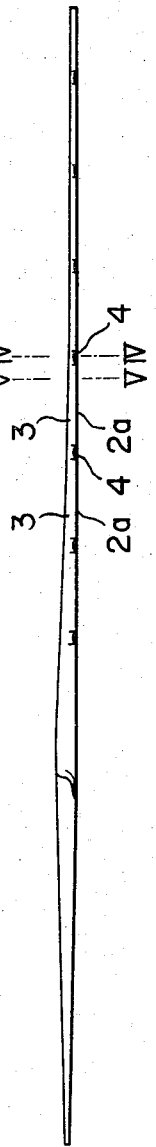
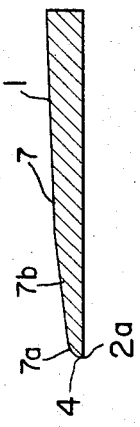
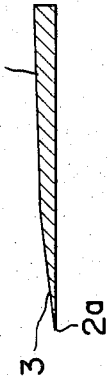

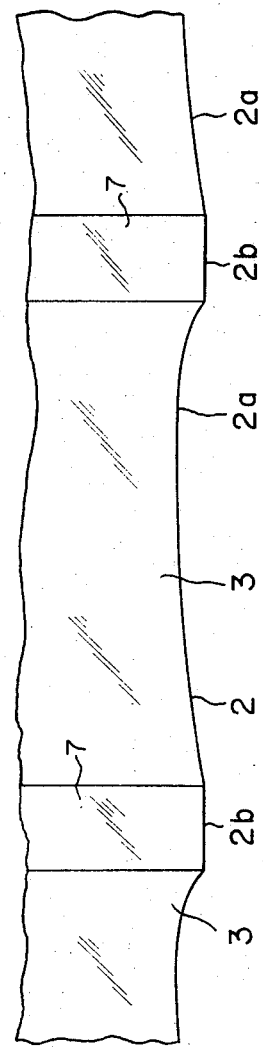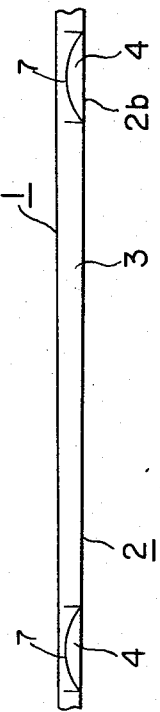

KNIFE

BACKGROUND OF THE INVENTION

This invention relates generally to cutlery, and more particularly to knives to be used with a cutting board.

When, for instance, a kitchen knife is used to cut an object on a wooden cutting board, the sharp cutting edge of the kitchen knife cuts to some extent into the surface of the cutting board. The surface of the cutting board thus becomes cut up and offers a good breeding area for bacteria or other microorganisms.

In order to eliminate such unsanitary conditions, cutting boards made of synthetic resin which are not easily cut by kitchen knives have been introduced.

However, when such a cutting board is used together with a kitchen knife or the like, it has been found that the cutting edge of the knife is worn more rapidly than in the case wherer the knife is used with a wooden cutting board, the ratio of wearing rates in the two cases being from several times to tens of times.

In other words, from the viewpoint of cutting edge protection, the wooden cutting board is more suitable than the synthetic resin cutting board, and from the viewpoint of sanitation, a hard cutting board made of synthetic resin, metal, glass, porcelain, or the like is more suitable.

SUMMARY OF THE INVENTION

A primary object of the present invention is to provide a knife having a cutting edge which is protected from wear or damage by a cutting board made of a material which is most advantageous from the sanitary viewpoint.

Another object of the invention is to provide a knife which is completely prevented from cutting the surface of a cutting board made of a soft material such as wood.

Still another object of the invention is to provide a knife which is easy to manufacture and economical in production.

These and other objects of the invention can be achieved by an improved construction of a knife which comprises a blade having a cutting edge, a series of portions projecting outward beyond the cutting edge, a series of portions concave relative to the same edge, each of the first portions and the second portions being disposed alternately along the cutting edge, each of the concave portions forming an individual cutting edge, and a substantially flat surface of a minimized area formed at the end of each of the projecting portions, whereby when the knife is used with a cutting board, the flat surfaces abut against the surface of the cutting board and the individual cutting edges of the knife are thereby prevented from contacting the cutting board.

The nature, principle, and utility of the present invention will be more clearly understood from the following detailed description of the invention when read in conjunction with the accompanying drawings, wherein like parts are designated by like reference numerals.

BRIEF DESCRIPTION OF THE DRAWINGS

In the drawings:

FIG. 1 is an elevational view of a knife according to the present invention;

FIG. 2 is an end view of the knife shown in FIG. 1 with the handle omitted;

FIG. 3 is a bottom view as viewed from the side of the cutting edge of the knife shown in FIG. 1;

FIG. 4 is an enlarged cross-sectional view taken along the line IV—IV in FIG. 3;

FIG. 5 is an enlarged cross-sectional view taken along the line V—V in FIG. 3;

FIG. 6 is a fragmentary elevational view, on much enlarged scale, of one part of the knife shown in FIG. 1; and FIG. 7 is a fragmentary bottom view, also on much enlarged scale, of one part of the knife shown in FIG. 1.

DETAILED DESCRIPTION OF THE INVENTION

As is best illustrated in FIG. 1, an embodiment of a knife according to the present invention comprises a blade 1 and a tang 5 which is accommodated in a handle 6 indicated by phantom lines. The blade 1 has a cutting edge generally designated by numeral 2. A series of slightly concave portions 2a and a series of projecting portions 2b are provided along the cutting edge 2 in an alternate manner so that one of the first portions 2a comes after one of the second portions 2b.

Thus, the concave portions 2a are formed into individual cutting edges 3 of, for instance, a single bevel as shown in FIGS. 2 and 3, and the projected portions 2b are formed into abutting surfaces 4 of a minimized area which has no cutting ability.

As is best indicated in FIGS. 4 and 7, each of the abutting surfaces 4 may be formed into a segment of a circle positioned within each of the projected portions 2b, and the cutting edges 3 formed in the slightly concave portions 2a are formed, in this particular example, into single bevel blades as is best seen in FIGS. 5 and 6.

In effect, as seen in the drawing, a series of parallel ribs 7 are provided on one surface of the blade 1. These ribs 7 are raised from the remainder of this surface of the blade 1 and their ends at the cutting edge 2 form the projecting portions 2b, respectively, which have no cutting ability.

As shown in FIG. 4, the end part of each rib 7 is rounded as indicated at 7a to provide abutting surface 4 and it has an inclined face 7b which is raised from the surface of the cutting edge 2. The inclined face 7b is very important for obtaining a wedging effect in the case of a cutting operation.

Thus, when the knife according to the present invention is vertically forced down in an object placed on a cutting board and is pushed or pulled forward or backward parallel to the surface of the cutting board, the wedging inclined part 7b of each rib 7 first operates to wedgingly separate or push away the part of the object being cut and then the individual cutting edge 3 cuts into the pushed-away part, whereby the cutting effect of the knife is improved as compared with the conventional knives.

In the above described case, because the abutting surfaces 4 are provided in an alternate manner between the cutting edges 3 of the blade 1, there is no possibility of the cutting board being cut by the cutting edges provided in the concave portions 2a of the blade 1 or of the individual cutting edges 3 being damaged by the hard cutting board made of, for instance, synthetic resin.

For the above described reasons, the knife according to the present invention does not loose its sharpness for long periods of time regardless of the nature of the cutting board being used, and sanitary control of the kitchen or the like can be easily attained.

I claim:

1. A knife comprising a blade with a cutting edge having a series of non-cutting portions projecting outwardly beyond said cutting edge and a series of concave portions recessed from said cutting edge, the projecting portions and the concave portions being disposed in alternate arrangement along said cutting edge, each of said recessed portions forming an individual cutting edge, a series of parallel elongated ribs formed on one side surface of said blade and extending transversely of said cutting edge over a substantial transverse width of said surface, each said rib having one end at the cutting edge forming a respective said projecting portion, said ribs being raised from the remainder of said one side surface of the blade and having said one ends thereof rounded to form the non-cutting portions.

2. A knife as claimed in claim 1 wherein the width of each of said recessed portions as measured in the direction of said cutting edge is substantially greater than the width of each of said ribs.

* * * * *